United States Patent
Kenney et al.

(10) Patent No.: US 11,564,286 B2
(45) Date of Patent: Jan. 24, 2023

(54) GATEWAY LINK MANAGEMENT BETWEEN DISJOINT SUBNETWORKS IN A CDMA MANET

(71) Applicant: L3Harris Technologies, Inc., Melbourne, FL (US)

(72) Inventors: Brent A. Kenney, Bountiful, UT (US); Jeffrey B. Bench, Lehi, UT (US); Brian J. Thorp, Sandy, UT (US); Matthew J. Reimann, Draper, UT (US); Patrick L. Newbold, Draper, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 66 days.

(21) Appl. No.: 17/246,023

(22) Filed: Apr. 30, 2021

(65) Prior Publication Data

US 2022/0361289 A1    Nov. 10, 2022

(51) Int. Cl.
| | |
|---|---|
| *H04W 88/16* | (2009.01) |
| *H04W 40/24* | (2009.01) |
| *H04W 84/18* | (2009.01) |
| *H04L 12/66* | (2006.01) |
| *H04L 61/5014* | (2022.01) |

(52) U.S. Cl.
CPC ............ *H04W 88/16* (2013.01); *H04L 12/66* (2013.01); *H04L 61/5014* (2022.05); *H04W 40/24* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 5,652,751 | A | * | 7/1997 | Sharony ................. H04L 45/46 455/445 |
| 6,304,556 | B1 | | 10/2001 | Haas |
| 10,181,972 | B1 | | 1/2019 | Giallorenzi et al. |
| 10,652,806 | B1 | * | 5/2020 | Hirz ..................... H04W 52/383 |
| 11,432,248 | B1 | * | 8/2022 | Kenney ............... H04W 52/243 |
| | | | | (Continued) |

FOREIGN PATENT DOCUMENTS

| | | |
|---|---|---|
| CN | 111526519 A | 8/2020 |
| EP | 2552151 A1 | 1/2013 |
| | (Continued) | |

OTHER PUBLICATIONS

European Search Report received for EP Patent Application No. 22166083.0, dated Sep. 9, 2022, 9 pages.

*Primary Examiner* — Kenny S Lin
(74) *Attorney, Agent, or Firm* — Workman Nydegger

(57) ABSTRACT

Joining subnets in mobile ad-hoc network (MANET) environment. A method includes, based on SNR, power and data rate information between a first gateway node for a first subnet and a second gateway node for a second subnet, determining a rate at which the first and the second subnets can connect if nodes in the first subnet reduce signal transmit rate to a predetermined level. The method further includes as a result of determining that the determined rate meets or exceeds a predetermined threshold, then joining the first and second subnets by joining the first and second subnets via the first and second gateway nodes and causing nodes in the first subnet to reduce signal transmit rate to the predetermined level.

20 Claims, 2 Drawing Sheets

(56) References Cited

U.S. PATENT DOCUMENTS

2016/0094481 A1   3/2016  Xu et al.
2018/0309587 A1*  10/2018 Johnsen .............. H04L 63/0442
2019/0158371 A1*  5/2019  Dillon ................... H04L 47/196

FOREIGN PATENT DOCUMENTS

EP     3010305 B1   5/2019
GB     2531267 A    4/2016

* cited by examiner

_200_

202

Based on SNR, power and data rate information between the first gateway node for a first subnet and a second gateway node for a second subnet, determining a rate at which the second gateway node can connect to the first gateway node if nodes in the first subnet reduce signal transmit rate to a predetermined level

204

As a result of determining that the determined rate meets or exceeds a predetermined threshold, then joining the first and second subnets by joining the first and second subnets via the first and second gateway nodes and causing nodes in the first subnet to reduce signal transmit rate to the predetermined level

*Figure 2*

GATEWAY LINK MANAGEMENT BETWEEN DISJOINT SUBNETWORKS IN A CDMA MANET

BACKGROUND

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Some computing systems communicate using ad-hoc mesh networks, which are typically wireless decentralized networks where the various nodes in the mesh network identify neighbor nodes to add to the network. One example of such a network is a code division multiple access (CDMA) mobile ad-hoc network (MANET).

Some MANETs are made up of smaller subnetworks (sometimes referred to as subnets). Often there are disjoint subnets, or even subnets made up of a single individual node, that exist where it is desirable to join the disjoint subnets into the same MANET. For any node that is outside of the MANET range to join the MANET, information is exchanged. Thus, there is typically some type of a side channel used for node discovery purposes. In particular, whenever the MANET increases its range to bring in another node or subnet, it must increase its power and/or decrease its rate, and thus communication indicating power and/or rate changes are needed. Increasing the power has a negative consequence for network interference in a CDMA MANET. Further, reducing the rate results in a slower network, meaning that latency is higher.

New neighbors being added to a mesh network are outside of the current range of a data-bearing transmission. In some systems, a distant neighbor discovery technique is achieved using a multi-channel waveform implementation, where one channel (referred to herein as the traffic channel) is used to convey user data (i.e., data for use of users of nodes in a network) and the second channel (referred to herein as the probe channel) is used to facilitate acquisition of new neighbors. Power and rate (PAR) information with respect to channels can be exchanged in messages between nodes. For example, a node can indicate to other nodes power levels and data rates at which data is being sent and/or received. Further, messages can be provided between nodes where a node can indicate the signal to noise ratio for received data for the node.

The coverage area of the network probe channel is limited to the operational power of the individual nodes. General practice in a CDMA MANET is to minimize transmit power while still achieving network objectives in order to keep CDMA interference low. This may be problematic as nodes in subnets may be orders of magnitudes further away from nodes in other subnets than they are from nodes in their current subnet. This results in many individual nodes needing to transmit at high power and/or low data rates to communicate with nodes in other subnets to couple individual subnets. Many nodes transmitting at higher power creates interference problems for a CDMA MANET.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a mobile ad-hoc network (MANET) environment. The method includes acts for joining subnets in mobile ad-hoc network (MANET) environment. A method includes, based on SNR, power and data rate information between a first gateway node for a first subnet and a second gateway node for a second subnet, determining a rate at which the first and the second subnets can connect if nodes in the first subnet reduce signal transmit rate to a predetermined level. The method further includes as a result of determining that the determined rate meets or exceeds a predetermined threshold, then joining the first and second subnets by joining the first and second subnets via the first and second gateway nodes and causing nodes in the first subnet to reduce signal transmit rate to the predetermined level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates a method of joining subnets in a mobile ad-hoc network.

DETAILED DESCRIPTION

Figure 1:
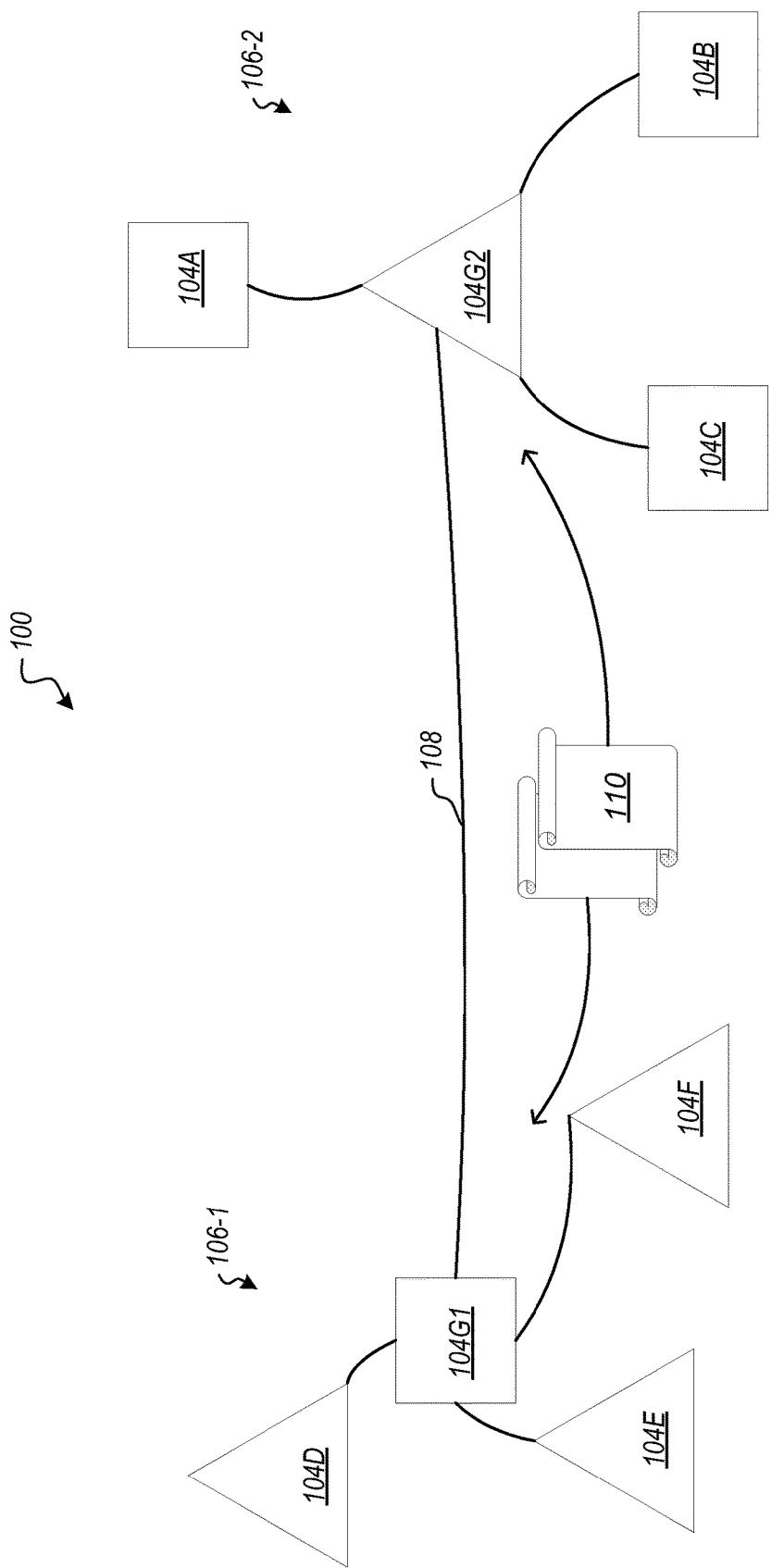
FIG. 1 illustrates a topology with two subnets and a process for joining the subnets.

Embodiments illustrated herein join disjoint subnets by causing gateway nodes in different subnets to communicate with each other to determine achievable rates between the gateway nodes (rather than requiring each of the individual nodes in different subnets to communicate with each other to join subnets), and if the rates are sufficient, then to join the subnets. In particular, gateway nodes are elected to search for disjoint subnets. When another subnet is discovered, the local gateway node determines whether or not the forward and return link to the remote gateway can be made at a suitable rate. If the rate is below the acceptable threshold, the local gateway does not sacrifice performance in its subnetwork to accommodate a remote gateway that is out of effective range. Embodiments can determine that the local gateway node can increase the rate received by the remote gateway node. Further, embodiments can determine if a forward link (local to remote) has a high enough potential rate to be useful. Further embodiments can determine if a return link (remote to local) has a high enough potential rate to be useful.

Thus, embodiments are implemented where gateway nodes can estimate the achievable rate between gateway nodes in the subnets. Rates are estimated both for forward (data sent from a first gateway to a second gateway) and return (data received by the first gateway from the second gateway) links. In some embodiments, it is assumed that the gateway nodes have exchanged messages providing information about signal power and/or data rate between nodes, and signal to noise ratio (sometimes expressed as $E_b/N_0$, which is energy per bit divided by noise power spectral density) feedback, as described in more detail below. Note that in other embodiments, other signal to noise ratios may be used, such as $E_s/N_0$, which is based on the energy per symbol instead of the energy per bit. In some embodiments all signal to noise ratio feedback will be treated as traffic signal to noise ratio except for the gateway's signal.

In some embodiments, the potential rates are calculated with the assumption that each gateway will command neighboring nodes in their respective subnets to turn down to some predefined minimum acceptable rate (e.g. 250 kbps).

In some embodiments, one piece of information used for estimating rate is the total power measured after filtering. The total power is usually a value that is only measured locally, but for the calculations illustrated herein, it is assumed that the maximum total power value (i.e., the total power that the node is allowed to transmit) is being transmitted via an appropriate message. This maximum total power value is communicated inasmuch as it could be different from node to node. The value could also vary in time, so it is updated periodically. As another option, the gateway could transmit an equivalent parameter or set of parameters could be transmitted that would allow the maximum total power to be calculated. For example, once such parameter might be power headroom or the potential rate. In some embodiments, the rate may be expressed using a processing gain index (PGI) where supported rates are indexed against an index number. In such systems, fewer bits can be sent in the message by sending only the index number as opposed to the actual rate value.

Referring now to FIG. 1, in the topology 100, nodes 104G1 and 104G2 are gateway nodes, for different subnets 106-1 and 106-2 respectively. Both of nodes 104G1 and 104G2 have neighbors in their respective subnets, but only the neighbor connections relevant to these potential rate calculations are represented, which are the neighbors that are transmitting at the same center frequency as the remote gateway node and have a direct connection with the local gateway node. Node 104G1 transmits at the center frequency represented by the squares and node 104G2 transmits at the center frequency represented by the triangles. Node 104G1 has neighbor nodes 104D, 104E, and 104F that are also transmitting at the triangle center frequency. Node 104G2 has neighbor nodes 104A, 104B, and 104C that are transmitting in the square center frequency. Node 104G1 receives a message from node 104G2 with signal to noise ratio and rate information for nodes 104G1, 104A, 104B, and 104C.

Gateway link management controls the acquisition and maintenance of links between disjoint subnets within a MANET. As illustrated, one gateway node is selected, such as by example by performing a node election, from each subnet to reach out beyond the subnet in search of disjoint subnets. Connectivity between disjoint subnets is managed between selected gateway nodes.

A local gateway node can throttle the rate of nodes, in its subnet, transmitting at the same center frequency as the remote gateway in order to improve the potential rate of the return link. Once the local gateway hears a remote gateway (usually through the probe channel), it estimates the traffic channel rate that the remote gateway would be able to transmit, assuming that the local gateway throttles the rate of the local subnet nodes that would interfere with the remote gateway. This estimated remote transmit rate is sent to the remote gateway. Thus, for example, gateway node 104G1 may be the local gateway node, and can throttle the data rates of nodes 104D, 104E, and 104F. Gateway node 104G2 (which in this example is the remote gateway node) may send a probe message which is received by gateway node 104G1. Gateway node 104G1 can then estimate the traffic channel rate for the traffic channel 108. This estimated rate is sent from gateway node 104G1 to gateway node 104G2. Note that the traffic channel estimated rate returned by 104G1 is only for 104G2 to 104G1. There is a separate rate that goes in the opposite direction 104G1 to 104G2 that can be determined in a similar fashion.

After the traffic channel rates are estimated and exchanged, gateway nodes will check if both sides can operate above the predetermined threshold rate. If so, the gateway nodes elect to form a link and proceed to throttle local (with respect to each gateway) nodes and modify their own power and rate (PAR).

Once the gateway link is established, the gateway node manages the maximum rate of its subnet neighbors that are transmitting on the remote gateway's transmit frequency such that they do not exceed the rate achieved by the incoming gateway link. This management process continues until the gateway link can no longer achieve the threshold rate or the disjoint subnets merge.

In the example illustrated in FIG. 1, nodes 104G1 and 104G2 are gateway nodes for different disjoint subnets 106-1 and 106-2.

Nodes 104G1 and 104G2 have exchanged initial messages 110 with data sufficient to determine SNR (signal to noise ratio), power (and in some cases maximum power) and data rate information and are evaluating the link 108, which as discussed previously includes two directions where each direction is evaluated separately using the principles illustrated herein, as they are not identical. In particular, Node 104G1 can send a message with data sufficient to determine SNR, power and data rate information indicating the SNR and rate for the data channel for data received by node 104G1 from node 104G2. Similarly, node 104G2 can send an SNR message indicating the SNR for the data channels for data received by node 104G2 from node 104G1.

Node 104G1 is transmitting at the same center frequency as nodes 104A, 104B, and 104C in subnet 106-2.

Node 104G2 is transmitting on a different center frequency than node 104G1 (hence the triangle instead of the square). Node 104G2 may have neighbors at another center frequency as well, but they are not of interest in this example because they do not interfere with the signal coming from node 104G1. Node 104G2 calculates the data rate that it could receive data (at some threshold SNR) from node 104G1 if nodes 104A, 104B, and 104C were throttled back to some minimum acceptable rate. It is preferable that node 104G2 does not throttle the rates back until node 104G1 is actually in range because, otherwise this would degrade network performance. The following now illustrates calculations that can be performed on node 104G2 (or in some embodiments, node 104G1, or some other alternate processor, and results passed to node 104G2). The following illustrates computations that can be performed.

Definitions:

$[E_b/N_0]_i$: $E_b/N_0$ of the $i^{th}$ node $PBO_{Tr,i}$: Power Backoff ratio for the $i^{th}$ node's Traffic Channel $P_{rcvd,i}$: Total Received Power from the $i^{th}$ node $R_{Tr,i}$: Traffic Channel Rate for the $i^{th}$ node $N_0$: Noise Spectral Density $J_0$: Interference Spectral Density due to jammer or unknown nodes $P_T$: Total Power Received from all known nodes with reportable $E_b/N_0$ $R_c$: Chip Rate $X_i$: Percentage of the total power received from the $i^{th}$ node $R_{probe}$: Probe message rate for node 104G1

$PBO_{probe}$: Power Backoff ratio for the Probe Channel during a probe message $X_{sum}$: Percentage of the total power received from the known nodes RSSI: Received Signal Strength Indicator (total power received after filtering)

$[E_b/N_0]_{tgt}$: Target $E_b/N_0$ $P_{rcvd,G1}$: Total Received Power from node 104G1 when transmitting at max power $PBO_{Tr,G1}$: Power Backoff ratio of the Traffic Channel for node 104G1

$R_{pot}$: Potential Rate of node 104G1

$\Delta_i$: Proportionality constant relating the minimum acceptable rate to the current rate of node i. If the current rate of node i is less than the acceptable rate, then $\Delta_i$ is set to unity. Otherwise $\Delta_i$ is expected to be in the interval (0, 1].

$X_i$ values are calculated for each neighbor node (including node 104G1) based on traffic or probe information $$X_i = \frac{R_{Tr,i}}{PBO_{Tr,i}\left(\frac{R_c}{[E_b/N_0]_i} + R_{Tr,i}\right)}$$

For node 104G1, this value can easily be adapted as follows (using an assumed probe $E_b/N_0$):

$$X_i = \frac{R_{probe}}{PBO_{probe}\left(\frac{R_c}{[E_b/N_0]_i} + R_{probe}\right)}$$

$X_{sum}$ is calculated and used to estimate the noise-plus-interference spectral density ($N_0+J_0$).

Define $X_{sum}$ as the sum of all $X_i$ values. Note that $X_{sum}$ is the ratio of total received signal power to total received power.

$$X_{sum} = \Sigma X_i$$

The sum of the noise power spectral density and the interference power spectral density is computed as $$N_0 + J_0 = \left(\frac{RSSI}{R_c}\right)(1 - X_{sum}).$$

The power received from node 104G1 is $P_{rcvd,G1} = (RSSI)X_{G1}$.

In general, the power received from node i is given by $P_{rcvd,i} = (RSSI)X_i$

The potential rate is then calculated based on the info received from node 104G1 and the anticipated back-off ($\Delta_i$) associated with interfering nodes.

$$R_{pot} = \frac{\frac{PBO_{Tr,G1}P_{rcvd,G1}}{[E_b/N_0]_{tgt}}}{N_0 + J_0 + \frac{\sum P_{rcvd,i}\Delta_i + (1-PBO_{Tr,G1})P_{rcvd,G1}}{R_c}}$$

This equation is sufficient for an iterative search for $R_{pot}$, since $PBO_{Tr,G1}$ depends on $R_{pot}$. The PBO depends upon the traffic rate due to the fact that the probe channel rate stays constant and embodiments set the power backoff of each channel such that they have the same range. The iterative procedure would start with $PBO_{Tr,G1}$ being set to unity (ideal case). The resulting value of $R_{pot}$ after flooring to the next valid rate will then map to a new value of $PBO_{Tr,G1}$. $R_{pot}$ is computed again with the new value of $PBO_{Tr,G1}$. This process continues until the new value of $R_{pot}$ after flooring is equal to the previous value of $R_{pot}$ after flooring. Since successive values of $R_{pot}$ should be lower in value, the algorithm can stop if the calculated $R_{pot}$ is ever greater than the previous value (when oscillation between two close values occurs, either of the two values is acceptable) or less than the minimum PGI rate (indicating that there is no valid solution).

The following illustrates a derivation of the preceding principles.

Potential Rate

The potential rate (or forward rate) that node 104G1 can achieve is computed using equations derived below, and as discussed above. The derivation has the following steps: (1) use the reported $E_b/N_0$ (or other signal to noise ratio) values to solve for the sum of the noise power density plus the unknown interference power density (i.e. $N_0+J_0$); (2) assume that all neighbors will be throttled to the same rate achievable from the remote node and calculate the potential rate. Note that this estimate of the potential rate is conservative because there could likely be nodes that are not power-control neighbors to node 104G2, which are causing unknown interference, but their power will turn down once their rate is commanded down to the minimum acceptable rate, $R_{min}$.

Derivation (1) Express the measured $E_b/N_0$ for each identified neighbor of node 104G2, including node 104G1 (adjustments will need to be made to use the probe $E_b/N_0$ from node 104G1), and then solve for $N_0+J_0$:

$$[E_b/N_0]_i = \frac{\frac{PBO_{Tr,i}P_{rcvd,i}}{R_{Tr,i}}}{N_0+J_0+\frac{P_T-PBO_{Tr,i}P_{rcvd,i}}{R_c}}$$

where, $P_T = P_{rcvd,i}$ $$N_0+J_0+\frac{P_T-PBO_{Tr,i}P_{rcvd,i}}{R_c} = \frac{PBO_{Tr,i}P_{rcvd,i}}{R_{Tr,i}[E_b/N_0]_i}$$

$$N_0+J_0+\frac{P_T}{R_c} = \frac{PBO_{Tr,i}P_{rcvd,i}}{R_{Tr,i}[E_b/N_0]_i}+\frac{PBO_{Tr,i}P_{rcvd,i}}{R_c}$$

$$\frac{P_T+(N_0+J_0)R_c}{R_c} = PBO_{Tr,i}P_{rcvd,i}\left(\frac{R_c+R_{Tr,i}[E_b/N_0]_i}{R_cR_{Tr,i}[E_b/N_0]_i}\right)$$

$$P_{rcvd,i} = \frac{(P_T+(N_0+J_0)R_c)R_{Tr,i}[E_b/N_0]_i}{PBO_{Tr,i}(R_cR_{Tr,i}[E_b/N_0]_i)}$$

Define $X_i$ as the ratio of power from the $i^{th}$ emitter to the total received power.

$$P_{rcvd,i} = (P_T+(N_0+J_0)R_c)X_i \text{ or } P_{rcvd,i} = (RSSI)X_i$$

$$X_i = \frac{R_{Tr,i}}{PBO_{Tr,i}\left(\frac{R_c}{[E_b/N_0]_i}+R_{Tr,i}\right)}$$

For node 104G1, this value can easily be adapted as follows (assuming probe $E_b/N_0$):

$$X_i = \frac{R_{probe}}{PBO_{probe}\left(\frac{R_c}{[E_b/N_0]_i}+R_{probe}\right)}$$

Express the total signal power as the sum of the power from each emitter.

$$P_T = \Sigma(P_T+(N_0+J_0)R_c)X_i$$

$$P_T = (P_T+(N_0+J_0)R_c)\Sigma X_i$$

Define $X_{sum}$ as the sum of all $X_i$ values. Note that $X_{sum}$ is the ratio of total received signal power to total received power.

$$X_{sum} = \Sigma X_i$$

$$P_T = (P_T+(N_0+J_0)R_c)X_{sum}$$

$$P_T - P_T X_{sum} = (N_0+J_0)R_c X_{sum}$$

$$P_T(1-X_{sum}) = (N_0+J_0)R_c X_{sum}$$

$$N_0+J_0 = \left(\frac{P_T}{R_c}\right)\frac{(1-X_{sum})}{X_{sum}}$$

It can be shown that $P_T = (RSSI)X_{sum}$, where RSSI is the total measured power at the receiver after filtering. This results in the following expression for $N_0+J_0$:

$$N_0+J_0 = \left(\frac{RSSI}{R_c}\right)(1-X_{sum})$$

(2) Calculate the new potential rate for node 104G1, assuming that node 104G2 will command all nodes to reduce their rate to the same rate achievable by node 104G1.

$$R_{pot} = \frac{\frac{PBO_{Tr,G1}P_{rcvd,G1}}{[E_b/N_0]_{tgt}}}{N_0+J_0+\frac{\sum P_{rcvd,i}\Delta_i+(1-PBO_{Tr,G1})P_{rcvd,G1}}{R_c}}$$

As noted previously, this equation is sufficient for an iterative search for $R_{pot}$, since $PBO_{Tr,G1}$ depends on $R_{pot}$. The iterative procedure would start with $PBO_{Tr,G1}$ being set to unity (ideal case). The resulting value of $R_{pot}$ after flooring to the next valid rate (based on PGI) will then map to a new value of $PBO_{Tr,G1}$. $R_{pot}$ is computed again with the new value of $PBO_{Tr,G1}$. This process continues until the new value of $R_{pot}$ after flooring is equal to the previous value of $R_{pot}$ after flooring. Since successive values of $R_{pot}$ should be lower in value, the algorithm is stopped if the calculated $R_{pot}$ is greater than the previous value (oscillation between two close values—either is acceptable) or less than the minimum PGI rate (no valid solution).

Return Rate

In order to use the same framework already described, the analysis focuses on node 104G2's calculation of node 104G1's return rate. This calculation uses the same equations as shown for the potential rate because potential rate and return rate are the same in this case, given the assumption that gateway nodes are transmitting at their maximum power. The difference in the return rate calculation is that the RSSI value is known through measurement, but the power received when node 104G1 is transmitting at maximum power, $P_{rcvd,G1}$, is reported, either directly or indirectly, through messaging.

Subnet Adaptation after Gateway Connection is Established

After the gateway traffic connection is established, the local gateway node (node 104G2 in the current framework) will continue to calculate the noise plus interference power density as before. In addition, the local gateway node will calculate the achievable rate for the nodes on the remote gateway's transmit frequency. As the rate changes, updates will be sent via control messages. If the achievable rate drops below the minimum allowed rate, then the minimum allowed rate should still be commanded until the gateway connection times out. After that point, the nodes resume normal operation.

After the gateway link has been established, the local gateway can gradually increase the rate of the intra-subnet neighbors until the rate is equal to the potential rate of the remote gateway. This may be achieved by a dampened response, since increasing the rate usually results in a larger increase in power due to CDMA interference. The following procedure can be performed for all gateway rate tracking, whether increasing or decreasing the rate. It should be noted that some minimum number of intervals of exchanged power and rate and/or signal to noise ratio (where each interval comprises sending power and rate information and/or signal to noise ratio information, and adjusting power and rate as appropriate) may be implemented between steps to allow nodes to settle. Any appropriate number of intervals can be implemented. The following procedure can be performed:

1. Calculate the potential rate of the remote gateway assuming the current rate of the intra-subnet neighbors, using the following equation:

$$R_{pot} = \frac{\frac{PBO_{Tr,G1}P_{rcvd,G1}}{[E_b/N_0]_{tgt}}}{N_0 + J_0 + \frac{\sum P_{rcvd,i} + (1 - PBO_{Tr,G1})P_{rcvd,G1}}{R_c}}$$

where $R_{pot}$ is computed via iterative means due to its relationship to $PBO_{Tr,G1}$. Note that if the remote gateway is already transmitting at its maximum power, then the potential rate is the current rate and this calculation can be skipped.

2. Compute the ratio of the calculated potential rate to the current rate of the intra-subnet neighbors (in dB). This value will be greater than unity if $R_{pot}$ is greater than the rate of the intra-subnet neighbors.

3. Divide the dB value in half, and apply it to the current rate of the intra-subnet neighbors to arrive at the new rate.

4. Divide the halved dB value by the degradation threshold (e.g. 0.5 dB) and add three to determine the number of PAR intervals until the next rate update.

The advantage to this method is that it still allows each node to make connectivity decisions as it normally would. The disadvantage of this method is that the intra-subnet nodes (i.e., node in a particular subnet) drop all the way down to the minimum acceptable rate before they can be adjusted to a steady-state value. However, if subnets are converging, the minimum acceptable rate may be the starting point for the intra-subnet nodes anyway.

Normal Operation in the Subnet

The elevated latency rate is chosen as a value that will allow the subnet to meet its latency requirements. It is also selected as an achievable rate under normal operating conditions. A topology manager, which may be implemented on one of the nodes or at an external entity, tries to keep connectivity well-pruned such that nodes do not attempt to connect with every node in the subnet. Each of the nodes implements a greedy algorithm that seeks to establish its link at the desired rate at the expense of others. Due to CDMA interference, a limit on the power step size will be imposed on PAR based on the impact that the power step will cause on the node's neighbors. For instance, the maximum power step will be calculated that will cause no more than 0.5 dB of degradation to the neighboring nodes' receivers. The resulting power step value will be greater than or equal to 0.5 dB for single antenna operation.

Merging Subnets

One indicator that subnets are ready to be merged is that both gateway nodes are operating at the elevated latency rate. If this is the case, the gateway nodes would stop restricting the power control decisions of neighboring nodes, and allow connections to form in a normal manner. Each gateway node (or some other outside entity) informs its own subnet of the change, by sending a control message to add the other subnet into the node list of the local subnet. After the new subnet is formed, the gateway nodes will decide which node will remain as a gateway. This can be performed by a node election process. In some embodiments, only the original gateway nodes will be allowed to be elected. In other embodiments, the node election can select from other nodes as well.

Splitting Subnets

Subnets are usually split based on command (i.e. directed by an administrative authority, such as a mission commander when each node represents military personnel). Alternatively, subnets may be split based on some external algorithm. Alternatively still, there could be cases where nodes are separated from other nodes in their subnet due to attrition. If this is the case, those nodes can form a subnet and elect a gateway node, whose responsibility it would be to reach out to other nodes.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 2, a method 200 is illustrated. The 200 includes acts for joining subnets in a mobile ad-hoc network (MANET). The method includes performing the following acts at a first gateway node. For example, the acts may be performed by the gateway node 104G1 illustrated in FIG. 1.

The method 200 includes, based on SNR, power and data rate information between a first gateway node for a first subnet and a second gateway node for a second subnet, determining a rate at which the first and the second subnets can connect if nodes in the first subnet reduce signal transmit rate to a predetermined level (act 202). For example, SNR, power and data rate information may be received at the gateway node 104G1 from node 104G2 for the node 104G1 and the nodes in the subnet 106-2 that are neighbors to node 104G2 and transmitting at the same center frequency as node 104G1. The power and rate information can be used to determine if node 104G1 can establish a traffic link to node 104G2 at the target $E_b/N_0$ with a sufficient data rate.

As a result of determining that the determined rate meets or exceeds a predetermined threshold, the method 200 further includes, then joining the first and second subnets by joining the first and second subnets via the first and second gateway nodes and causing nodes in the first subnet to reduce signal transmit rate to the predetermined level (act 204). Thus, the subnets 106-1 and 106-2 can be joined if the sufficient rate can be achieved.

The method 200 may be practiced where determining the rate at which the first and second subnets can connect comprises obtaining at least a portion of the SNR, power and data rate information from the second gateway node and computing the rate at which the first and second subnets can connect. For example, the gateway node 104G2 can provide power and rate information for itself, as well as other nodes in the subnet 106-2.

The method 200 may be practiced where determining the rate at which the first and second subnets can connect comprises obtaining the rate at which the first and second subnets can connect from the second gateway node as a result of the second gateway node computing the rate at which the first and second subnets can connect using the SNR, power and data rate information. Thus, the gateway node 104G2 can calculate the rate at which the subnets can connect based on power and rate information measured or received at the gateway node 104G2 and provide that information to the gateway node 104G1, which can then make the determination as to whether or not the subnets should join.

The method 200 may be practiced where joining the first and second subnets causes a new subnet to be created, the method further comprising nodes in the new subnet electing a new gateway node. Thus, for example, once subnets 106-1 and 106-2 join to form a new subnet, a new gateway node can be chosen. In some embodiments, the new gateway node is only selected from existing gateway nodes. This may be done to reuse configuration already applied to the gateway node or for other reasons of efficiency. Alternatively, a new gateway node may be selected from among a set of nodes including nodes other than the gateway nodes.

The method 200 may be practiced where determining a rate at which the first and second subnets can connect comprises determining data rates from the first gateway node to the second gateway node and the second gateway node to the first gateway node. That is, as described above, both forward and return rates can be determined.

The method 200 may be practiced where the SNR, power and data rate information between the first gateway node and the second gateway node is obtained from messages transmitted on a probe channel in a multi-channel system comprising the probe channel used for identifying new neighbor nodes and a traffic channel for transmitting user data.

The method 200 may be practiced where determining a rate at which the first and second subnets can connect comprises performing an iterative process to identify a minimum rate.

The method 200 may further include, after joining the first and second subnets, the first gateway node gradually increasing the rate of the nodes in the first subnet while maintaining the threshold rate between the first and second gateway nodes. In some embodiments, this may involve the first gateway node gradually decreasing its own data rate while gradually increasing the data rates of the nodes in the first subnet. Eventually, the data rate of the first gateway may be at or around the data rates of the nodes in the first subnet.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of joining subnets in a mobile ad-hoc network (MANET), the method comprising a first gateway node performing the following:
based on SNR, power and data rate information between the first gateway node for a first subnet and a second gateway node for a second subnet, determining a rate at which the second gateway node can connect to the first gateway node if nodes in the first subnet reduce signal transmit rate to a predetermined level;
and
as a result of determining that the determined rate meets or exceeds a predetermined threshold, then joining the first and second subnets by joining the first and second subnets via the first and second gateway nodes and causing nodes in the first subnet to reduce signal transmit rate to the predetermined level.

2. The method of claim 1, wherein determining the rate at which the first and second subnets can connect comprises obtaining at least a portion of the SNR, power and data rate information from the second gateway node and computing the rate at which the first and second subnets can connect.

3. The method of claim 1, wherein determining the rate at which the first and second subnets can connect comprises obtaining the rate at which the first and second subnets can connect from the second gateway node as a result of the second gateway node computing the rate at which the first and second subnets can connect using the SNR, power and data rate information.

4. The method of claim 1, wherein merging the first and second subnets causes a new subnet to be created, the method further comprising nodes in the new subnet electing a new gateway node.

5. The method of claim 1, wherein determining a rate at which the first and second subnets can connect comprises determining data rates from the first gateway node to the second gateway node and the second gateway node to the first gateway node.

6. The method of claim 1, wherein the SNR, power and data rate information between the first gateway node and the second gateway node is obtained from messages transmitted on a probe channel in a multi-channel system comprising the probe channel used for identifying new neighbor nodes and a traffic channel for transmitting user data.

7. The method of claim 1, wherein determining a rate at which the first and second subnets can connect comprises performing an iterative process to identify a minimum rate.

8. The method of claim 1, further comprising, after joining the first and second subnets, the first gateway node gradually increasing the rate of the nodes in the first subnet while maintaining the threshold rate between the first and second gateway nodes.

9. A computer system comprising:
one or more processors; and
one or more computer-readable media having stored thereon instructions that are executable by the one or more processors to configure the computer system to joining subnets in a mobile ad-hoc network (MANET), including instructions that are executable to configure the computer system to perform at least the following:
based on SNR, power and data rate information between a first gateway node for a first subnet and a second gateway node for a second subnet determining a rate at which the first and the second subnets can connect if nodes in the first subnet reduce signal transmit rate to a predetermined level; and
as a result of determining that the determined rate meets or exceeds a predetermined threshold, then joining the first and second subnets by joining the first and second subnets via the first and second gateway nodes and causing nodes in the first subnet to reduce signal transmit rate to the predetermined level.

10. The computer system of claim 9, wherein determining the rate at which the first and second subnets can connect comprises obtaining at least a portion of the SNR, power and data rate information from the second gateway node and computing the rate at which the first and second subnets can connect.

11. The computer system of claim 9, wherein determining the rate at which the first and second subnets can connect comprises obtaining the rate at which the first and second subnets can connect from the second gateway node as a result of the second gateway node computing the rate at which the first and second subnets can connect using the SNR, power and data rate information.

12. The computer system of claim 9, wherein merging the first and second subnets causes a new subnet to be created, the method further comprising nodes in the new subnet electing a new gateway node.

13. The computer system of claim 9, wherein determining a rate at which the first and second subnets can connect comprises determining data rates from the first gateway node to the second gateway node and the second gateway node to the first gateway node.

14. The computer system of claim 9, wherein the SNR, power and data rate information between the first gateway node and the second gateway node is obtained from messages transmitted on a probe channel in a multi-channel system comprising the probe channel used for identifying new neighbor nodes and a traffic channel for transmitting user data.

15. A computer-readable storage medium having stored thereon instructions that are executable by one or more processors to configure a computer system to joining subnets in a mobile ad-hoc network (MANET), including instructions that are executable to configure the computer system to perform at least the following:
based on SNR, power and data rate information between a first gateway node for a first subnet and a second gateway node for a second subnet determining a rate at which the first and the second subnets can connect if nodes in the first subnet reduce signal transmit rate to a predetermined level; and as a result of determining that the determined rate meets or exceeds a predetermined threshold, then joining the first and second subnets by joining the first and second subnets via the first and second gateway nodes and causing nodes in the first subnet to reduce signal transmit rate to the predetermined level.

16. The computer readable storage medium of claim 15, wherein determining the rate at which the first and second subnets can connect comprises obtaining at least a portion of the SNR, power and data rate information from the second gateway node and computing the rate at which the first and second subnets can connect.

17. The computer readable storage medium of claim 15, wherein determining the rate at which the first and second subnets can connect comprises obtaining the rate at which the first and second subnets can connect from the second gateway node as a result of the second gateway node computing the rate at which the first and second subnets can connect using the SNR, power and data rate information.

18. The computer readable storage medium of claim 15, wherein joining the first and second subnets causes a new subnet to be created, the method further comprising nodes in the new subnet electing a new gateway node.

19. The computer readable storage medium of claim 15, wherein determining a rate at which the first and second subnets can connect comprises determining data rates from the first gateway node to the second gateway node and the second gateway node to the first gateway node.

20. The computer readable storage medium of claim 15, wherein the SNR, power and data rate information between the first gateway node and the second gateway node is obtained from messages transmitted on a probe channel in a multi-channel system comprising the probe channel used for identifying new neighbor nodes and a traffic channel for transmitting user data.

* * * * *